C. V. HAYS.
CHICKEN COOP.
APPLICATION FILED NOV. 25, 1911.
1,039,532.
Patented Sept. 24, 1912.
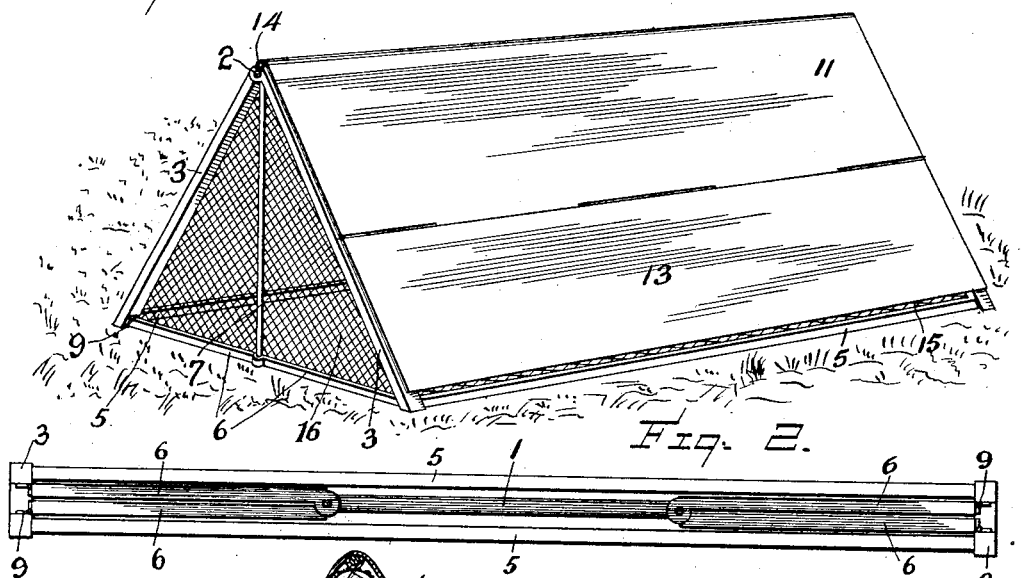
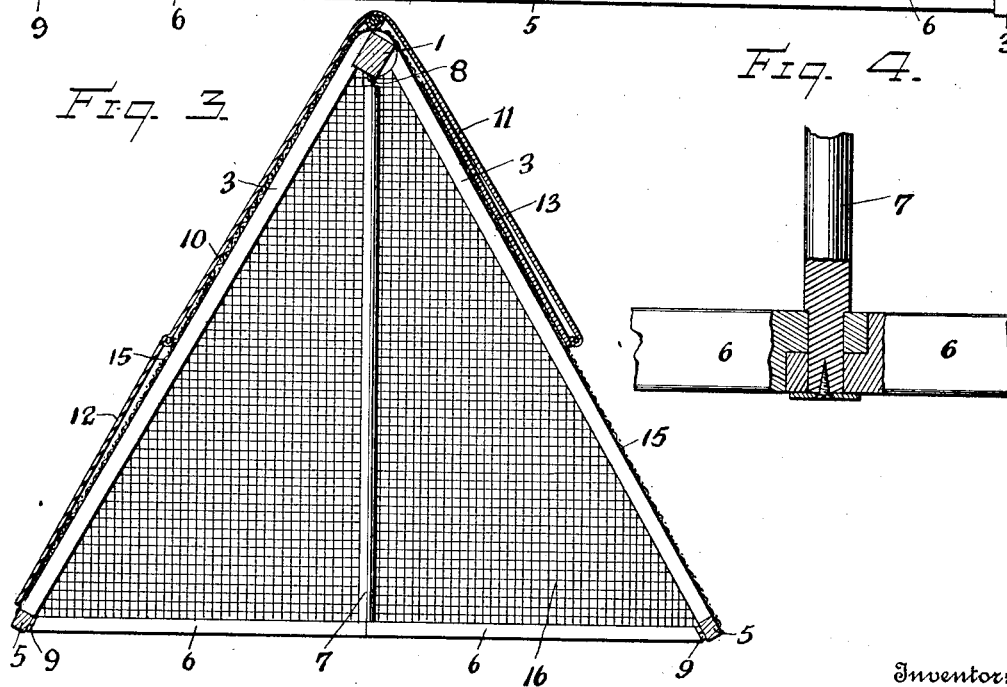
Witnesses:
Inventor:
C. V. Hays
By Victor J. Evans
Attorney

UNITED STATES PATENT OFFICE.

CASWELL V. HAYS, OF DILLON, SOUTH CAROLINA.

CHICKEN-COOP.

1,039,532. Specification of Letters Patent. Patented Sept. 24, 1912.

Application filed November 25, 1911. Serial No. 662,377.

*To all whom it may concern:*

Be it known that I, CASWELL V. HAYS, a citizen of the United States, residing at Dillon, in the county of Dillon and State of South Carolina, have invented new and useful Improvements in Chicken-Coops, of which the following is a specification.

This invention relates to chicken coops.

The principal object of the invention is to provide a simple and efficient device of this character which may be folded into small compass so as to occupy little space in storage or transportation.

A further object of the invention is the provision of a folding chicken coop having a folding cover therefor, the sides of which are adapted to be regulated so as to procure the proper ventilation and light and to protect the chicks from the elements.

Further objects of the invention will appear as the following specific description is read in connection with the accompanying drawing, which forms a part of this application, and in which:—

Figure 1 is a perspective view showing the coop set up for occupancy. Fig. 2 is a bottom plan view showing the device in folded position. Fig. 3 is a vertical sectional view taken transversely through the coop and showing one section of the cover raised to secure proper ventilation and sunlight. Fig. 4 is a detail view showing the connection between the end spreader members.

Referring more particularly to the drawing, 1 represents a ridge pole which is provided with reduced ends 2 upon which are pivoted the end members 3. The lower terminals of the end members are connected together by side bars 5 and by the spreader members 6 which are hinged in their center upon the reduced end of a rod 7, whose opposite end is flexibly connected to the ridge pole through the medium of a pair of screw eyes 8. The spreader members 6 are connected to the lower ends of the end members 3 by hinges 9 so that each section of the spreader members may pivot upon the end members when the device is folded, as shown in Fig. 2.

The top cover is composed of a plurality of sections 10, 11, 12 and 13, all hingedly connected together, as shown. The pointer rod for the hinge of the sections 10 and 11 has connected to it a pair of rings 14 which are also connected to the ridge pole. The lower sections 12 and 13 of the cover are somewhat narrower than the upper sections and are so constructed that they may be folded beneath the upper sections when it is desired to give more ventilation or secure more sunlight in the coop.

The frame 1 consists of the end members, ridge pole, and side members, is covered with a suitable wire fabric 15 of suitable mesh, and suitable pieces of fabric 16 are connected to the spreader members, end members, and pivoting rod 7.

What is claimed is:

A chicken coop comprising a frame consisting of a ridge pole, a pair of end members pivoted to each end of the ridge pole, spreader members hinged in the center and hinged at their ends to the end members, a dividing pole forming a pintle for the center hinge of the spreader members, and being hingedly connected to the ridge pole, an open mesh fabric covering the frame, together with a folding top connected to the ridge pole.

In testimony whereof I affix my signature in presence of two witnesses.

CASWELL V. HAYS.

Witnesses:
J. L. PETTIGREW,
J. S. BLACK.

Copies of this patent may be obtained for five cents each, by addressing the "Commissioner of Patents, Washington, D. C."